(12) United States Patent
Verstraete et al.

(10) Patent No.: US 9,384,710 B2
(45) Date of Patent: Jul. 5, 2016

(54) OPTICAL CORRECTION FOR HIGH UNIFORMITY PANEL LIGHTS

(75) Inventors: Gerrit Verstraete, Pittem (BE); Tom Kimpe, Ghent (BE)

(73) Assignee: BARCO N. V., Kortrijk (BE)

( * ) Notice: Subject to any disclaimer, the term of this patent is extended or adjusted under 35 U.S.C. 154(b) by 849 days.

(21) Appl. No.: 11/665,987

(22) PCT Filed: Oct. 25, 2005

(86) PCT No.: PCT/EP2005/011420
§ 371 (c)(1),
(2), (4) Date: Apr. 23, 2007

(87) PCT Pub. No.: WO2006/045586
PCT Pub. Date: May 4, 2006

(65) Prior Publication Data
US 2009/0195559 A1    Aug. 6, 2009

(30) Foreign Application Priority Data
Oct. 25, 2004    (EP) .................................... 04447236

(51) Int. Cl.
*G09G 5/10* (2006.01)
*G09G 3/34* (2006.01)
(Continued)

(52) U.S. Cl.
CPC ............ *G09G 5/10* (2013.01); *G02F 1/133606* (2013.01); *G02F 1/133611* (2013.01);
(Continued)

(58) Field of Classification Search
CPC ................... G02F 1/133606; G02F 1/133611; G02F 1/133603; G02F 1/133609; G02F 2001/133607; G09G 3/3413; G09G 3/06; G09G 3/342; G09G 5/10; G09G 2320/0233; G09G 2320/0242; G09G 2320/0285; G09G 2320/0646

USPC .......................................... 345/690–694, 102
See application file for complete search history.

(56) References Cited

U.S. PATENT DOCUMENTS 5,566,010 A * 10/1996 Ishii et al. ...................... 349/42
5,793,344 A    8/1998 Koyama
(Continued)

FOREIGN PATENT DOCUMENTS

EP    0 571 173    11/1993
EP    1 424 672    6/2004
(Continued)

OTHER PUBLICATIONS

Examination Report of European Patent Office with regard to European Patent Application No. 05 806 017.9-1228, Jun. 24, 2009.
Search Report of European Patent Office regarding European Patent Application No. 07 000 488.2-1228, Aug. 27, 2009.
Official Communication of European Patent Office regarding European Patent Application 05806017.9, Jul. 21, 2010.
(Continued)

*Primary Examiner* — Christopher E Leiby
(74) *Attorney, Agent, or Firm* — Bacon & Thomas, PLLC

(57) ABSTRACT

A display has a spatial light modulator (10) for dynamically controlling a luminance of each pixel according to an input signal, the spatial light modulator having a non uniform spatial characteristic, the display also having an optical filter (20) having a spatial pattern to alter the luminance to compensate at least partially for the non uniform spatial characteristic. An electronic signal processing element applies some pre compensation predominantly of higher spatial frequencies for the non uniform spatial characteristic. Such dynamic and optical compensation can enable tuning for different optimizations or for compensating for variations over time. A backlight has an optical source and an optical filter, the source having a color output which has a non uniform spatial characteristic, and the optical filter having a spatial pattern to alter the color to compensate in part at least for the non uniform spatial characteristic.

32 Claims, 5 Drawing Sheets

(51) Int. Cl.
*G09G 3/06* (2006.01)
*G02F 1/1335* (2006.01)

(52) U.S. Cl.
CPC ............... *G09G3/06* (2013.01); *G09G 3/342* (2013.01); *G09G 3/3413* (2013.01); *G02F 1/133603* (2013.01); *G02F 1/133609* (2013.01); *G02F 2001/133607* (2013.01); *G09G 2320/0233* (2013.01); *G09G 2320/0242* (2013.01); *G09G 2320/0285* (2013.01); *G09G 2320/0646* (2013.01)

(56) References Cited

U.S. PATENT DOCUMENTS

| | | | |
|---|---|---|---|
| 6,406,159 | B1 | 6/2002 | Yamamoto |
| 7,113,670 | B2 * | 9/2006 | Robinson et al. ............... 385/31 |
| 2004/0179028 | A1 | 9/2004 | Arai |
| 2007/0001994 | A1 * | 1/2007 | Roth ............................ 345/102 |

FOREIGN PATENT DOCUMENTS

| | | |
|---|---|---|
| EP | 1424672 A1 | 6/2004 |
| EP | 1 645 798 A1 | 4/2006 |
| JP | 63179324 | 7/1988 |
| JP | 2-79022 | 3/1990 |
| JP | 7-261175 | 10/1995 |
| JP | 10-082916 | 3/1998 |
| JP | 11-353920 | 12/1999 |
| JP | 2000-206524 | 7/2000 |
| JP | 2002-169006 | 6/2002 |
| JP | 2002-244626 | 8/2002 |
| JP | 2003-162229 | 6/2003 |
| JP | 2004031023 | 1/2004 |
| JP | 2004-062136 | 2/2004 |
| JP | 2004-170698 | 6/2004 |
| JP | 2004-271623 | 9/2004 |
| JP | 2004279465 | 10/2004 |

OTHER PUBLICATIONS

Japanese Office Communication for counterpart foreign application No. 2007-537232 mailed Jun. 7, 2011.
Examination report dated Mar. 10, 2011 from European Patent Office regarding Application No. 05 806 017.9.
EPO communication in related application No. 07 000 488.2 dated Aug. 16, 2012.
Office Action from Korean Intellectual Property Office (KIPO) for Korean Patent Application 10-2007-7009302, dated Apr. 24, 2012 (33 pages).
Office Action from Japan Patent Office (JPO) for Japanese Patent Application 2007-537232, dated Jun. 19, 2012 (4 pages).
Office Action from Taiwanese Patent Office for Taiwanese Patent Application 094137260, dated Jun. 29, 2012 (20 pages).
Taiwanese Office Action for TW 094137260 with official letter dated Oct. 18, 2012, and English translation thereof.
Online! Oct. 2003, XP002321963, Retrieved from the Internet: URL:http://www.barco.com/barcoview/downloads/10__Arguments__for__I-Guard.pdf>, retrieved on Mar. 21, 2005!, Chapters: 3.1 I-Guard detects and corrects backlight instabilities and 3.2 I-Guard detects and corrects instabilities of the liquid crystal pixel cells.
Jenkins D R et al.: "Digital Imaging Colorimeter for Fast Measurement of Chromaticity Coordinate and Luminance Uniformity of Displays", Proceedings of the Spie, Spie, Bellingham, VA, US, vol. 4295, 2001, pp. 176-187, XP002287039, ISSN: 0277-786X.
Yourii Martynov et al.: "43.3 High-efficiency Slim LED Backlight System with Mixing Light Guide", 2003 SID International Symposium Baltimore, Maryland, vol. XXXIV, May 2003, pp. 1259-1261, XP007008345.
European Office Action dated Dec. 17, 2015, for EP 07000488.2.
English automated computer translation of previously submitted reference JP H07-261175.
European Office Action dated Mar. 16, 2015, for EP 07000488.2.
Matthijs P., "A front screen sensor technology for flat panel medical displays", White Paper: 10 Arguments for I-Guard, Barco Kortrijk, BE, Oct. 2003, pp. 1-13.

* cited by examiner

OPTICAL CORRECTION FOR HIGH UNIFORMITY PANEL LIGHTS

FIELD OF THE INVENTION

This invention relates to displays and to panel light sources, e.g. backlights for displays and to corresponding methods.

DESCRIPTION OF THE RELATED ART

There is a general requirement to provide panel light sources with a specific colour and preferably a uniform luminescence and colour over the surface area of the source. A traditional technique is to use light emitters of different colours, e.g. primary colours or colour filters, e.g. primary colour filters to set a particular colour, e.g. white of a certain colour temperature. Various techniques have been used to provide uniformity of luminescence, e.g. the use of diffusers.

A number of techniques have been described in the past to achieve high uniformity display systems. One possibility is to use electronic pre-correction of the image signal. In the limit this can be done up to pixel level. It involves altering values in a flame buffer. This means that for each pixel the pixel data sent to that pixel is adapted in order to achieve a more uniform image on the complete display.

However, such electronic correction for non-uniformity introduces some important problems. A first problem is a significant loss in contrast ratio of the display. This is because to generate a uniform image, the highest video level needs to be decreased in luminance and the lowest video level needs to be increased. For the lowest video level: because the lowest drive signal is zero (Data Drive Level DDL=0) it is not possible to decrease the highest luminance value down to the level of the darkest point in the display. Therefore the only solution is to increase the luminance of the darker points up to the level of the highest point. Of course the contrast ratio is decreased significantly. The same principle is valid for the highest video level.

A second possible problem is that of excessive reduction in gray levels at some pixel positions on the display. Since the actual display pixels are no longer driven between minimum (for instance 0) and maximum value (for instance 1023), the number of gray scales that can be displayed depends on the position of the pixel. In an example, pixel 1 is driven between (corrected) values 3 and 1020 and therefore has 1018 gray scale steps. Pixel 2 is driven between (corrected) values 0 and 900 and therefore has 901 gray scale steps. This problem can lead to a loss of visibility of some of the greys, in other words there can be "zero transitions" in the pixel behaviour. It is no longer possible to map all 1024 gray scales on the dynamic range of the pixel and therefore some greyscale transitions (on pixel level) will no longer be visible.

It is also known to provide an optical filter layer having white dots in a pattern to make the light output of a backlight more uniform, for use in e.g. an LCD display.

Another issue is uniformity of colour across the display. This is a particular issue for displays using a plurality of discrete light source such as LEDs as light sources for backlights as an alternative for fluorescent lamps. Backlights are the light sources for transmissive panel displays, e.g. liquid crystal displays. For example, in display applications, the use of LEDs of 3 or more different types, each emitting light of another colour, is of particular interest. The colours are usually primary colours. A usual choice is to use red, green and blue LEDs since they correspond with the 3 primary colours that are used in additive colour mixing and they allow display of many different colours.

A LED typically has one single relatively small peak in its emission spectrum, and it is therefore possible to manufacture LEDs emitting light of highly saturated red, green and blue colours. A wider colour gamut can be obtained from a mix of such highly saturated R, G, and B LEDs than from a backlight in which conventional fluorescent lamps having a phosphor mix coating on their glass wall are used. Such saturated LEDs are available from e.g. the Lumileds company, both as individual R, B and G LEDs or as a mix on a module that is basically an array of LEDs of different colours, placed at a distance of typically 9 mm from each other.

The use of LEDs of 3 different colours has the extra advantage that the colour of the resulting mix that exits the backlight, can be selected to lie on any point within a large gamut area within the colour triangle, simply by properly adapting the current drive of the 3 types of LEDs. It is therefore possible to generate white light of any desired colour temperature, are to change that colour temperature according to the needs of the display user. This is not only interesting for colour displays, but even for monochrome LCDs, that are often used in medical applications. This approach even enables the display of different colours on a monochrome LCD panel by sequencing the drive of the R, G and B LEDs in the backlight in time. However, this is only practical if the response time of the LCD is fast enough so that the sequencing can be done fast enough as to prevent annoying flicker on the display.

For all those reasons, a mix of R, G and B LEDs is preferred over the use of monochrome white LEDs in backlights for displays. White power LEDs (also available from the Lumileds company) typically emit a small peak in the blue and are coated with a phosphor that converts part of the blue photons into a wide spectral band in the yellow. This spectrum is very badly matched to the typical transmission characteristics of the colour filters in colour LCDs, decreasing the efficiency and resulting in a very reduced gamut of colours that can be displayed.

One practical problem in realising a backlight with LEDs of different types of colours is that all colours have to be mixed very well first before the resulting mix can be coupled out of the backlight and sent to the display panel.

If the mixing is not done well in space, the colour of the resulting white mix will not be uniform over the active area of the display, and since the human eye is very sensitive to even small variations of the colour coordinates on a white field, this will be noticed soon by the display user. The colour mixing problem cannot easily be solved by simple means when power LEDs are used, as is the case in most backlights, because they are relatively far apart from each other to make it possible to dissipate and sink the produced heat. (e.g. 9 mm in LED array modules from Lumileds). The problem of mixing the colours in space doesn't disappear if colour sequencing in time is used.

In the current state of the art, the colour mixing problem in backlights is partly solved by assuring that all light rays coming from LED sources have traveled a minimum distance through some mixing medium before they can be coupled out of the backlight. In backlights of the edge-lit type, this can be done in several ways. It is possible to use 2 light guides, each illuminated on one edge, instead of one single guide illuminated on 2 opposite edges. In each of both light guides, the outcoupling means (e.g. white painted dots on the back surface) then only start near the middle of the active area, so that the light rays have to travel at least through ⅓ of the length of the guide, where they are confined to stay in the guide by total internal reflection, before they have any chance to hit an outcoupling feature that permits some of the light to be coupled out. There should be some overlap between the outcoupling means of both light guides in the middle of the active area so that the entire display area is illuminated. There are several disadvantages in this approach: the thickness and weight of the backlight almost doubles and the cost increases; unless the white balance of the light mix of the LEDs is perfectly equal for both LED arrays illuminating each separate light guide, a discontinuity in colour will be perceived in the middle of the screen. It's also difficult to achieve luminance continuity in the middle of the screen for all viewing angles: if the current of both LED arrays is adjusted to achieve luminance uniformity for on-axis view (perpendicular to the screen), there is no guarantee that the luminance will be uniform in the middle at large viewing angles, because of structure is not symmetrical: one light guide is further away from the panel than the other, creating parallax and its emitted light must first travel through the other guide before it hits the diffuser. This topology has been proposed by the Lumiled company in some demonstrators.

It is known from US patent application 2004179028 to provide a colour mura correcting method, in which a colour mura film is added to an image display device, the complementary colour of the colour mura of the display image is generated in the colour mura correcting film, and thereby the colour mura of the display device is made inconspicuous. Mura is caused by systematic deviations in a display component such as a photomask and can be visible as stripes. Mura compromises the image quality of the finished display. Usually the deviations causing the mura are very small, below a few hundred nanometers. Deviations of that size spread over a large area can be difficult to detect by measuring.

SUMMARY OF THE INVENTION

An object of the invention is to provide improved displays and especially panel light sources, e.g. backlights for displays and to corresponding methods. An advantage of the present invention is to provide good colour uniformity on one hand, and small thickness and low weight and cost on the other hand.

According to a first aspect, the invention provides:

A display comprising addressable pixels and having a spatial light modulator for dynamically controlling a luminance of each pixel according to an input signal, the spatial light modulator having a non-uniform optical spatial characteristic, the display also having an optical filter and having a spatial pattern to alter the luminance and/or colour to compensate at least partially for the non-uniform spatial optical characteristic and having an electronic signal processing element arranged to apply some pre-compensation for the non-uniform optical spatial characteristic to the input signal.

The alteration of the luminance and/or colour is preferably to provide a more uniform light output across the display element as well as a more uniform colour.

An advantage of the optical filter is that the uniformity can be improved with reduced loss of any or all of contrast, grey levels, luminance and colour uniformity, compared to only electronic compensation. The materials used for the optical filter can be adsorbing, reflecting or emitting. Dichroic and bichromophoric materials are particularly preferred. The combination of dynamic and fixed compensation can enable some flexibility in the overall compensation, for tuning for different optimizations or for compensating for variations over time. The spatial light modulator can be any type of device including a reflective (e.g. DMD) a transmissive (e.g. LCD) or an emissive (e.g. LED) display or any combination thereof. In particular the display can be a fixed format display.

Another such additional feature is the pre-compensation being predominantly of higher spatial frequencies than spatial frequencies of the correcting spatial pattern.

Another such additional feature is the spatial light modulator comprising a transmissive or reflective device and the display comprising a light source.

Another such additional feature is the light source having a second non-uniform spatial characteristic, and the optical filter being arranged to compensate at least partially for the second non uniform spatial characteristic.

Another such additional feature is the spatial light modulator comprising a pixel addressable light emitting device.

Another such additional feature is the optical filter comprising a layer having dots, e.g. printed dots, applied to alter the transmissive characteristics of the filter. The dots vary in size and/or spatial density across the display element.

Another such additional feature is the optical filter comprising a layer having lines applied to alter the transmissive characteristics of the filter. The lines vary in thickness and/or spatial density across the display element. The line pattern may be built from dots.

Another such additional feature is the optical filter comprising a dynamically alterable spatial pattern. This can enable the compensation to be altered dynamically.

Another such additional feature is the optical filter being arranged between the back light and the transmissive layer.

Another such additional feature is the optical filter being arranged downstream of the spatial light modulator.

Another such additional feature is the Non-uniform optical spatial characteristic comprising any of contrast ratio, luminance, and colour point.

This aspect also provides a display comprising addressable pixels and having a spatial light modulator for dynamically controlling a luminance of each pixel according to an input signal, the spatial light modulator having a non-uniform spatial optical characteristic, the display also having an optical filter in the same optical path as the element and having a spatial pattern to alter the luminance, colour or luminance and colour to compensate at least partially for the non-uniform spatial optical characteristic.

A second aspect provides a light source for use with a transmissive or reflective pixel addressable spatial light modulator, e.g. the light source can be panel light such as a backlight for a display, the light source having a colour output which has a non-uniform spatial optical characteristic, and the optical filter having a spatial pattern to alter the colour to compensate in part at least for the non uniform spatial optical characteristic. The alteration of the colour is preferably to provide a more uniform colour across the panel light. This can enable the panel light, e.g. the backlight, to be made more uniform more efficiently, or can enable a less uniform light source to be used for example. It can enable less colour mixing to be needed and therefore simplify or reduce the thickness of some types of panel light, e.g. backlight. The known colour mura correction corrects for display colour modulator mura, but leaves any backlight uncorrected.

An additional feature for a dependent claim is the optical source comprising discrete colour light sources, e.g. LEDs, OLEDs.

Another such additional feature is the optical filter having two or more coloured areas, e.g. yellow, cyan and/or purple areas. These are most efficient for absorbing and modifying the common red green and blue optical sources.

Another such additional feature is the pattern being arranged to compensate for the non-uniformity of colour and/or luminescence.

Another such additional feature is the optical filter comprising a layer having printed dots.

Another such feature is the spatial pattern having multiple layers. This can enable the compensation to be carried out in stages, to allow for more diffusion and fewer artefacts.

Another such feature is the pattern additionally being arranged to pre compensate for a spatial non-uniformity of a spatial light modulator. This can provide better uniformity of the overall display.

Another such feature is the backlight having a backwall, the light source being arranged to direct light substantially parallel to the backwall, the backwall having reflectors to redirect the light out of the backlight, the optical filter being located on the backwall. This can enable the backlight to be kept thin, and keeps the filter away from the modulator, so as to reduce artefacts.

A third aspect provides a method of configuring a display having addressable pixels and an optical filter for compensating for non-uniformity of luminance or colour of a display element for dynamically controlling a luminance and/or colour of one or more pixels, comprising the steps of measuring an output for different pixels without the filter, determining a pattern for the filter according to the measurements, determining an amount of electronic pre-compensation, making the filter and configuring the electronic pre-compensation for the display.

This can enable compensation for effects of manufacturing variations. This can enable manufacturing tolerances to be reduced and so reduce costs or increase yields.

An additional feature is the further step of measuring an output for different pixels with the filter, determining a pattern for a further filter according to the measurements, making the further filter and adding the further filter to the display.

This can be regarded as an iterative method, more suitable for cases where the compensation is hard to calculate, for example where the effect of reflections is hard to model accurately.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DESCRIPTION OF THE PREFERRED EMBODIMENTS

Figure 1:
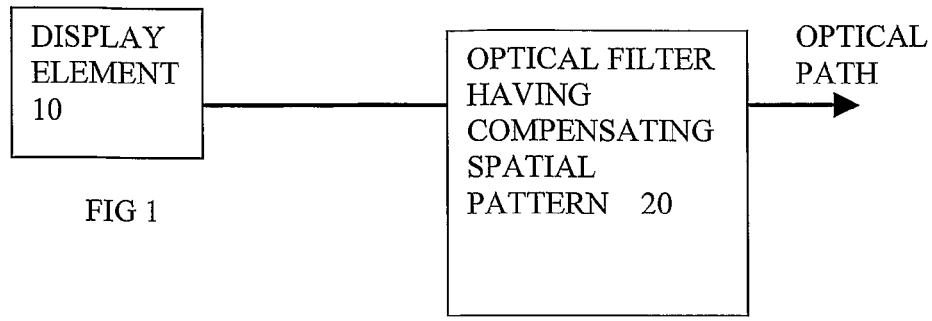
FIGS. 1-3 show embodiments of the invention in schematic form.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Figure 2:
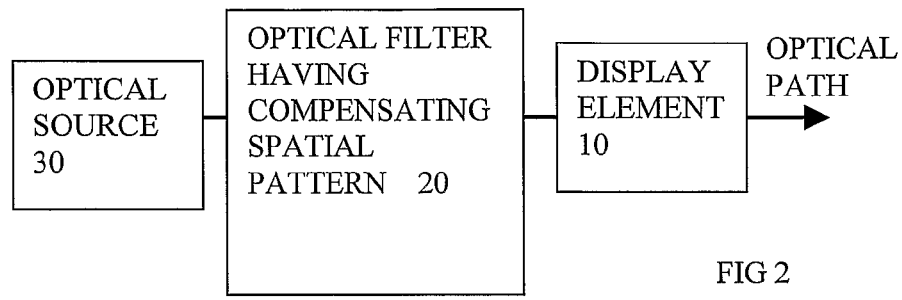
Figure 3:
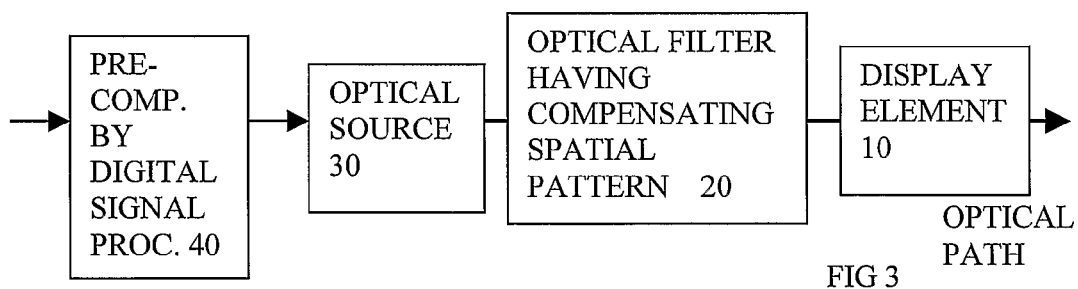

FIGS. 1-3, schematic views of embodiments of the invention:

FIG. 1 shows a schematic view of an embodiment of a display having a light source 30, coupled to a spatial light modulator 10 and an optical filter having a compensating spatial pattern 20. The spatial light modulator can be a reflective (e.g. DMD), a transmissive (e.g. LCD) or an emissive modulator (e.g. LED or OLED display). The spatial light modulator and optionally the light source as well, have a non uniform spatial optical characteristic, such as luminance, colour or contrast ratio for example. The spatial pattern of the filter is arranged to alter the luminance to compensate at least partially for the non-uniform spatial light output characteristic of the display element. Pre-compensation is provided by a signal processing part 40, (digital or analog as appropriate) to carry out some compensation of the input signal for the non-uniform spatial light output characteristic of the display element. This can be implemented using conventional signal processing hardware, following established principles which need not be described in more detail here. The electronic compensation can employ a frame buffer for example, and can be used for the higher spatial frequencies, leaving the lower spatial frequencies to be compensated by the optical filter. The spatial light modulator can be any type of device including a reflective or transmissive device or a light emitting device, or any combination. The optical filter can of course be transmissive, reflective, adaptive, active or passive, fluorescent and so on.

For some types of display, the light modulation function is effectively carried out by the optical source, (for instance: a LED backlight with hundreds of small LEDs with pitch of a few mm). In this case, the digital pre compensation can be applied to the optical source.

FIG. 2 shows another embodiment based on FIG. 1, and similar reference numerals have been used where appropriate. In this case the filter is after or downstream of the spatial light modulator. In this figure there is also shown a means 50 for measuring the output and determining what compensation to apply in terms of the spatial pattern and the amount of electronic pre-compensation.

FIG. 3 shows another embodiment, corresponding to the embodiment of FIG. 2 but in this case there is no electronic pre-compensation. The spatial light modulator 310 has luminance spatial non-uniformity, and the optical filter 320 is arranged to provide a compensating luminance spatial pattern. Optionally the filter can also compensate for non uniformities in the optical source. The filter can be located ahead of the spatial light modulator.

Display Contrast Ratio

Figure 4:
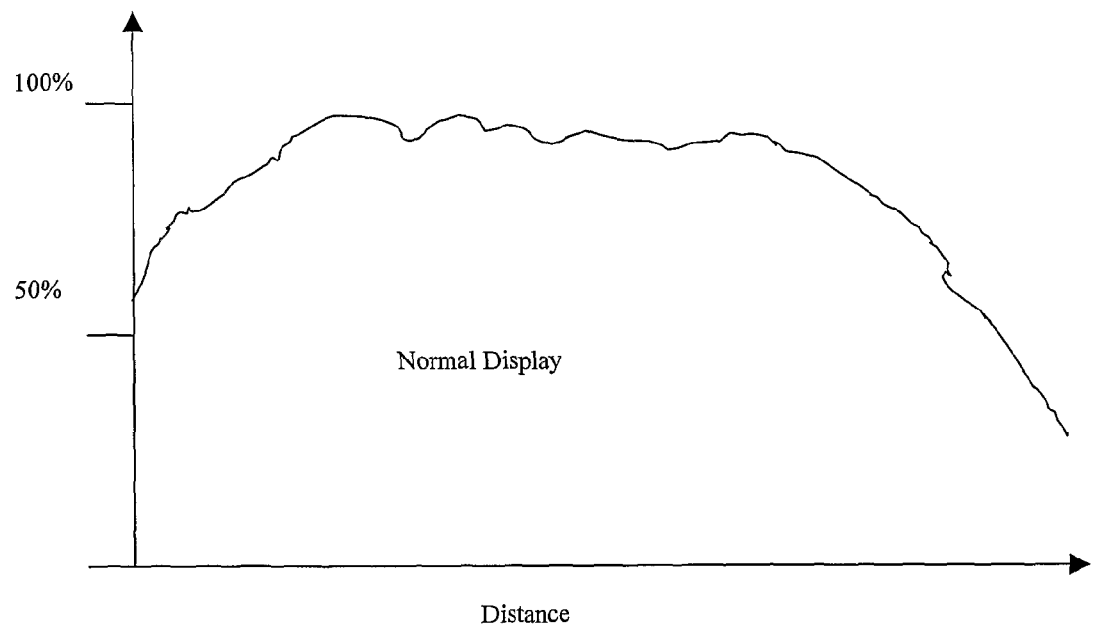
FIGS. 4-8 show characteristics or patterns for use in the embodiments.

By splitting up the luminance uniformity correction into an optical correction and an electronic correction it is possible to greatly improve the contrast while still keeping uniformity high. An additional feature is splitting the correction into a high frequency and a low frequency part. The low frequency correction can be implemented by means of a modified backlight system or by means of optical elements placed in the optical stack (such as foils). The high frequency correction can be implemented electronically at the display device. Typically the low-frequency correction can be large, e.g. up to 20%-30% peak to peak luminance correction, for instance close to the borders of the display. FIG. 4 shows an example of a non-uniform spatial characteristic before correction, looking at one dimension, e.g. an x-axis. Embodiments of the present invention make use of a filter whose optical characteristics vary spatially so as to compensate for non-uniformities of the panel light and/or display. Any method of making such a filter is included within the scope of the present invention, e.g. photographic film, paint layers, a dot pattern.

Figure 5:
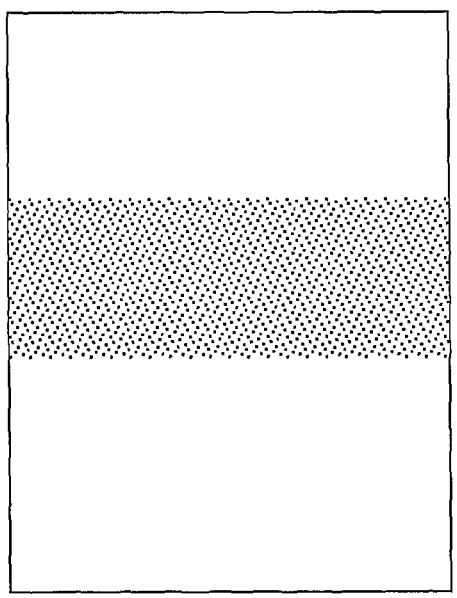
Figure 6:
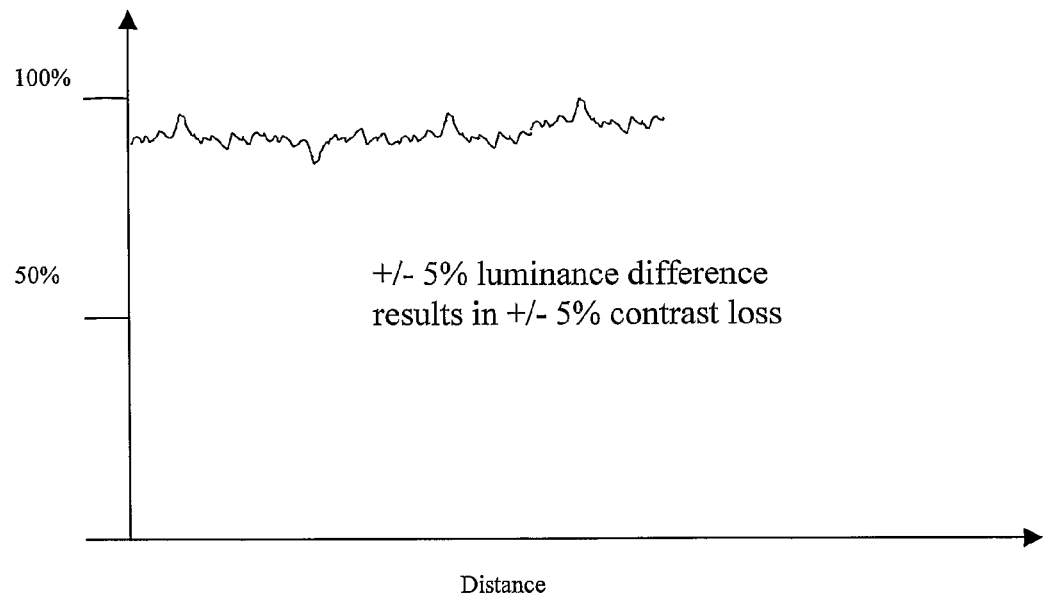

As an example, FIG. 5 shows a filter pattern having a concentration of dots in the middle to allow less light through, to compensate for this non-uniformity. FIG. 6 shows a more uniform spatial characteristic after partial compensation. This leaves plus or minus 5% luminance differences, which implies a corresponding 5% contrast loss, if compensated by conventional electronic means.

These large corrections are a major reason for the high-contrast loss when all correction is done electronically. If the optical design of the backlight system is changed so that intentionally the output is not-uniform but contains the inverse non-uniformities of the complete display system, then there is no more need to correct for these large luminance differences electronically. Then only the high frequency part can be corrected electronically and this will typically be only a few percent instead of 20%-30%. Hence, the contrast loss will be reduced to only a few percent.

In accordance with an aspect of the present invention, changing the backlight in case of an LED backlight is done by changing a dot-pattern that couples out the light so that the spatial distribution of the light that is coupled out is chosen to implement the low frequency uniformity correction. The dot pattern can have a diffusing effect. Another possibility is to keep the existing backlight design and use a foil to optically pre-correct the light going to the display. In case of an LCD this foil can be placed between the backlight and the LCD panel, e.g. best before any BEF (Brightness Enhancement Foil) layers. In any case, the result is that only minor corrections are required electronically, therefore there is a smaller reduction in contrast ratio for a given uniformity.

Note that one complication is that the appropriate uniformity corrections can depend on the video level. In one embodiment of the present invention an optimization or trade-off is made of the dot pattern based on uniformity characteristics of lowest and highest video levels.

The materials for use in making the optical filter can be adsorbing, reflecting or emitting (fluorescent). Particularly preferred are dichroic or bichromophoric materials. Dichroic materials reflect certain wavelengths and transmit others. The reflected light can reenter the backlight, can be reflected by a back mirror and can be reused in other parts of the display. Bichromophoric materials absorb light at first wavelengths and emit at other wavelengths (fluorescent). Such materials are described in "Energy transfer in macromolecules", N. L. Vekshin, SPIE, 1997. This conversion is very efficient and hence there is little energy loss. For example, for dot patterns: reflective and/or transmissive and/or emitting dots can be used. Any reduction of light is not too great a problem, e.g. in medical displays, because by just making the backlight brighter the light is gained back. The contrast is a larger problem. Coloured dots can e.g. be applied on many surfaces by a silk screen printing process, ink jet printing, xerographic printing, decal or any other form of transfer printing, etc. The embodiments of the invention are not restricted to the use of pigments but includes coloured dies. In addition other methods of making coloured filters are included in accordance with the present invention, e.g. making coloured filters from photographic film.

Note that the low-frequency correction part is mostly very alike within a specific product type. This means that the same low-frequency correction foil for instance is designed for a complete production run or for all displays of one type. Despite manufacturing variations the foil is used for all devices and the displays still have a high-contrast ratio and a high uniformity. For really high performance in a case of an LED backlight custom dot patterns, e.g. dedicated printing on a foil, is used for each display. This can result in contrast ratio of over 1000:1 with uniformity >95%.

Uncontrolled Reduction in Bit Depth

Splitting up the correction in an optical and an electronic part will also reduce the reduction in bit depth. But an extra solution is to use different dithering schemes depending on the actual minimum and maximum drive level of the pixels. For instance: if a first pixel is driven between DDL 64 and DDL 192 and a second pixel driven between DDL 0 and DDL 255 then it is possible to halve the steps of the first pixel so that it also has 256 steps.

Colour Displays

Embodiments of the present invention are particularly useful for colour displays. The problem of contrast ratio is even more difficult, e.g. to keep the peak white colour temperature correct, it will be necessary to reduce the Red/Green and Blue drive signals to the worst situation of the three when using electronic uniformity correction. Indeed, because of the uniformity correction on the three-colour planes the according contrast loss and reduction of colour gamut will be higher. Also the requirement for very accurate colour reproduction will require very precise colour steps. In this embodiment of the present invention a coloured dot pattern is used to perform an optical pre-correction, e.g. in the three colour planes, to avoid the contrast loss in the electronic uniformity correction. Note that this principle can also be used to obtain colour coordinate uniformity without requiring luminance uniformity. The same advantages are valid: higher contrast ratio, control over bit depth.

Figure 7:
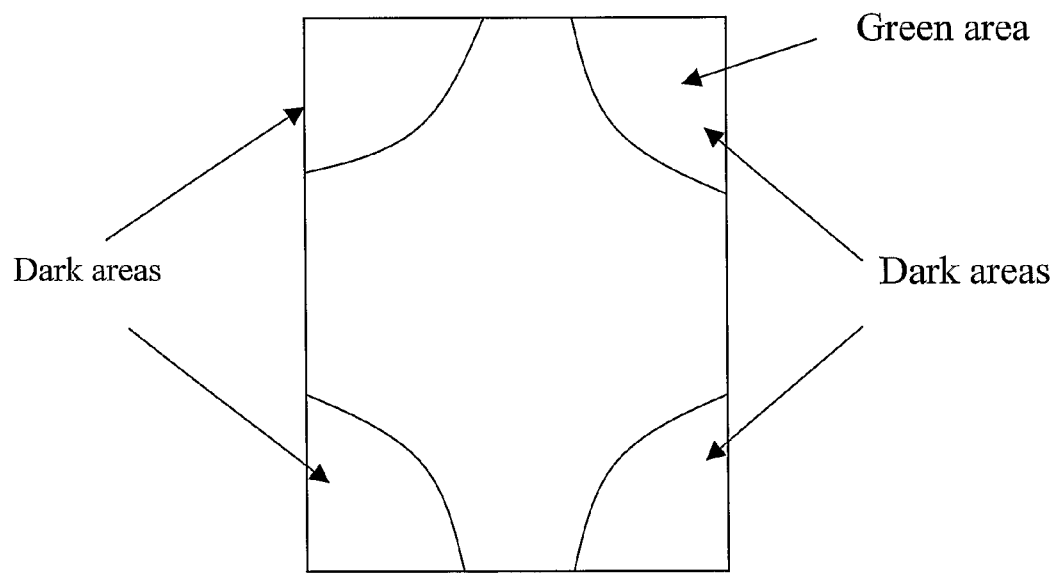
Figure 8:
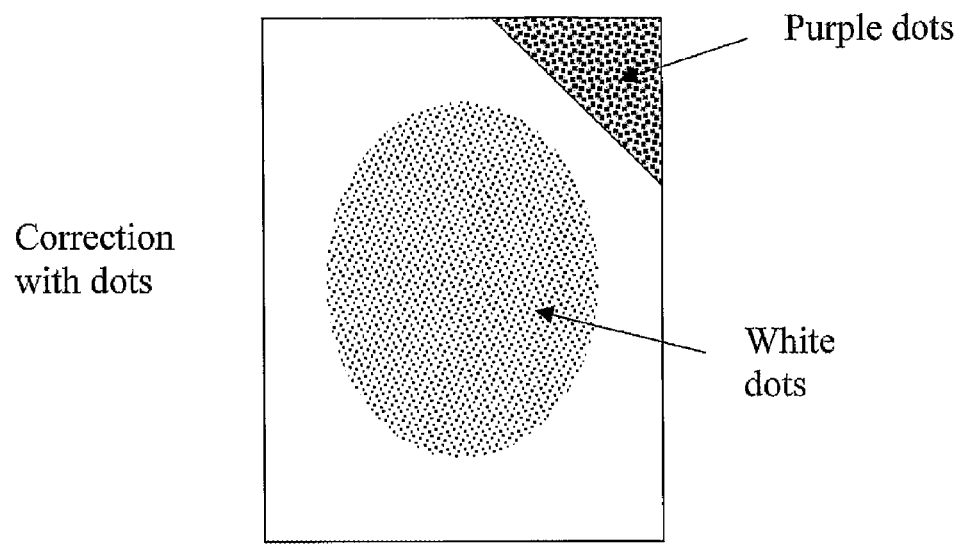

FIG. 7 shows an example of a display having a non-uniform spatial characteristic of colour. One corner is more green than other areas, the other three corners are darker. FIG. 8 shows an example of an optical filter with a spatial pattern to compensate. An area of purple dots is provided to compensate for the green area in one corner. At other corners there are fewer white dots so that more light gets through to compensate for the darker corners.

Applications:

Embodiments of the present invention can also be used for optical correction without the electronic correction. One example is in the production of a light panel for general use. In this case the uniformity will have improved but not to the level of for instance <5% non-uniformity. It is possible to measure and calculate the optimal optical pre-correction pattern for each display system individually or use the same correction pattern for a group, e.g. batch or type, of displays or even use the same correction pattern for all displays having a specific backlight type or LCD panel.

Notably, uniformity depends on video level, and so should be tested at a realistic level such as a level between peak white or peak black. The pattern can include a combination of white and coloured dots as needed. Colour and luminance intensity differences are defined in terms of Just Noticeable Differences, JND's. The pattern can be designed to optimize uniformity of JND (luminance and/or colour) or contrast ratio instead of colour and or luminance, as desired to suit the application.

Another feature is to adapt a panel light such as a backlight. This panel light can use a plurality of discrete light sources, e.g. LEDs, these discrete light sources including light sources of at least two colours, and coloured dots, or the panel light can use individual LEDs, OLEDs, EL, and so on. The backlight or the display can be optimized for constant colour temperature colour panels, e.g. for medical applications. A colour palette (large gamut) can be provided. A foil can be used to adapt GSDF instead of (colour) uniformity. A foil can be arranged to provide a constant contrast or eliminate any visible colour non-uniformity or luminance non-uniformity over the display area.

Figure 9:
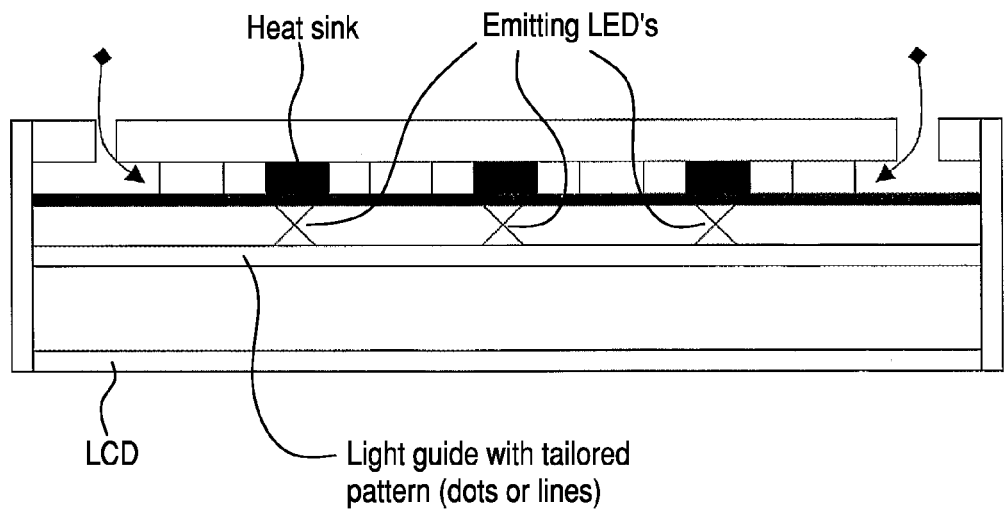
FIGS. 9 and 10 show backlight arrangements to which embodiments can be applied.
Figure 10:
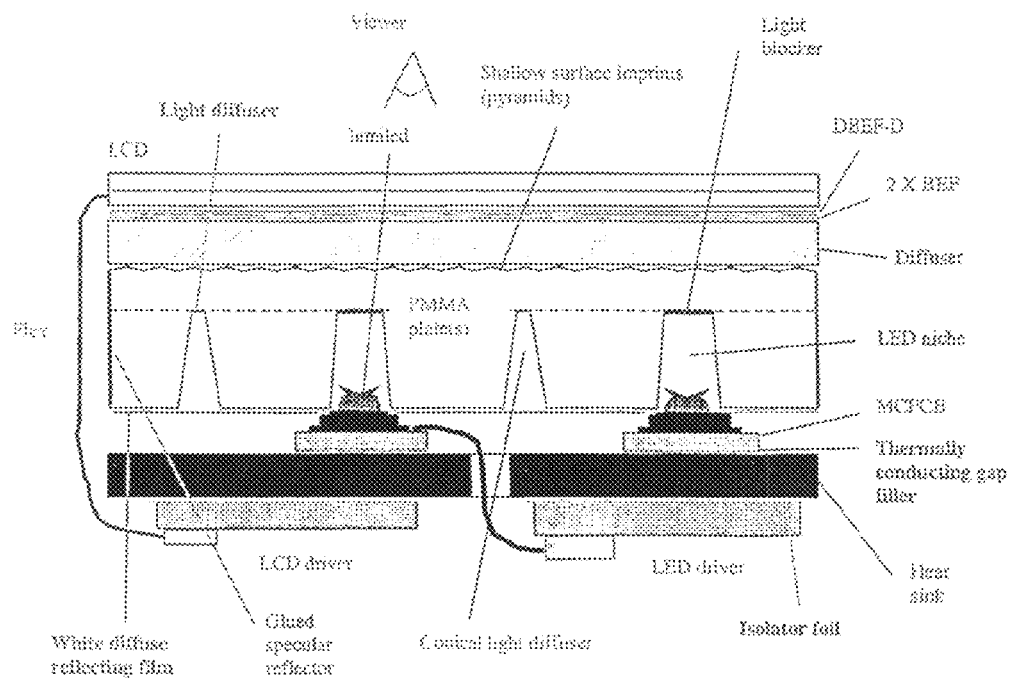

FIGS. 9,10 Backlight Colour Uniformity

The embodiments of backlights, described above are concerned with improving colour uniformity by compensating small remaining colour differences. They help enable a better compromise with slimness of the backlight (i.e. low depth or thickness) to realise a bright backlight with excellent colour uniformity in a slim hybrid backlight. To compensate for relatively small remaining colour non-uniformities in backlights including all the two or more colour, e.g. R-G-B LED backlight topologies described above, an optical filter in the form of a specially tailored pattern of coloured dots or lines is provided. It can be provided on at least one surface of one of the optical elements in the backlight, or on an extra film at some place in the backlight, of which the colour varies from point to point on the film.

The coloured dots or the coloured film can either reflect or transmit or, if the dots are fluorescent, emit most of the incident light, but the spectral response is not flat: the pattern has a coloured appearance, not a white, grey or black appearance. One easy way to obtain this effect is to use coloured painted dots or to use a colour film, both absorbing some part of the spectrum and reflecting or transmitting or emitting the remaining part of the visual spectrum. Coloured dots can e.g. be applied on many surfaces by a silk screen printing process, ink jet printing, xerographic printing, decal or any other form of transfer printing, etc. The embodiments of the invention are not restricted to the use of pigments but includes coloured dyes. The coloured appearance can be achieved by absorbing part of the incident light or by transmitting some part of the spectrum, while reflecting the other part, without significant absorption in the visual spectrum. As indicated above, fluorescent dies can also be used which emit light in one wavelength and absorb it in another.

In addition other methods of making coloured filters are included in accordance with embodiments of the invention, e.g. making coloured filters from photographic film. When R, G and B LEDs are used, the compensation for colour non-uniformities can be done most efficiently with yellow, cyan and purple filters. For example yellow, cyan and purple dots, i.e. absorbing, transmitting or emitting dots, are applied on one of the optical elements for simplicity. Such colours absorbs or reflect at least one of the primary colours blue, red or green preferentially. For example, yellow dots are applied at places that look blue, cyan dots at places that look too red, and purple dots at place that look rather green.

In the current state of the art of high efficient high power LEDs, the ratio between red, green and blue LEDs in the backlight is typically 1R:2G:1B. Because half of the LEDs are green, the uniformity coming from the green LEDs will only be better than the uniformity coming just from the red or coming just from the blue LEDs, since the red and blue LEDs are placed further apart on average. As a consequence, colour non-uniformities will typically have a reddish or bluish appearance and not a greenish appearance. Colour compensation can then be successfully realised by using only two colours in the filter, e.g. yellow and cyan filters.

The advantages of these embodiments are notable in the embodiments of FIGS. 9 and 10, using e.g. R, G, B LED backlights, because they show not only improved colour uniformity, but also reduced thickness of the backlight. With these embodiments, it is possible to design a thinner backlight that would otherwise feature unacceptable colour non-uniformity.

Embodiments of the coloured filter can be in the form of e.g. painted dots on one of the sides of a transparent plate, e.g. made of clear plastic such as PMMA (Poly(methyl methacrylate)), that is laid on top of a cavity illuminated by e.g. side-emitting discrete light sources, e.g. LEDs. Preferably the filter is applied on the side facing the LEDs because light-blockers just above the LED lenses are also applied on that side. These light blockers could in principle also be made from highly reflecting paint. However, the filter, e.g. the painted dots, can also be applied on the highly reflecting film on the bottom of the backlight cavity, through which the LEDs are popping. They can be applied on the diffuser on top of the cavity, but the risk for optical artefacts is greater because the dots are much closer to the display in that case, unless the pattern structure is very fine. A combination of a dotted structure on more than one surface is of course also possible.

In the embodiment of FIG. 10, a backlight and spatial light modulator in the form of an LCD is shown. The backlight has a light source in the form of an array of LEDs. Each LED is located in an LED niche in a backwall of a cavity of the backlight. Most light is emitted parallel to the backwall, then reflected out of the cavity by conical light diffusers on the backwall and by white diffuse reflecting film on the backwall. Specular reflectors can be provided on the sides of the cavity. Usually it is desirable to make the cavity as thin as possible. From the cavity, light passes through a diffuser plate having shallow surface imprints (pyramid shapes), then through a number of BEF layers to the LCD. Light blockers can be provided to prevent light from the LEDs passing out of the cavity directly without a reflection to diffuse it. The LEDs of the backlight are mounted on MCPCB, on top of thermally conducting gap filler, on top of a heat sink. On the other side of the heatsink is mounted LED driver circuitry. Of course other arrangements are possible.

The optical filter can be arranged at various parts of the backlight. A coloured filter, e.g. coloured dots can preferably be applied on the white diffuse reflecting film, but they can also be applied on one of the other surfaces of the cavity which guide the light. It is possible but typically less practical to put the filter on the surface having the specially structured surface pattern. The filter, e.g. dots can be applied on the diffuser plate on top of the light guide, but the chance for optical artefacts will be larger the closer the tailored structure with the filter, e.g. coloured dots is to the LCD panel. It is also possible to include an extra film that is mostly transparent but slightly coloured and therefore slightly absorbing some part of the visual spectrum dependent on the location on the film. Such film could e.g. be placed between the light guide and the diffuser plate.

In other embodiments, the compensation means contribute less to making the backlight thinner, but they can help enable the mixing zone to be made shorter and/or to significantly improve the colour non-uniformities that are still visible in at least one of the edges of the active area in most displays with R-G-B LED backlights.

In embodiments having edge lighting of the cavity, the mixing zone can be almost half of the length of the display and there is not so much need for compensation means. The artefacts are of a different kind. The better the initial colour uniformity of the backlight is, the lower the density of the coloured compensation means can be, and therefore the lower the total amount of absorbed light will be and the higher the overall optical efficiency will be.

Optical simulation or trial and error can be used to determine the optimal pattern of the coloured features of the filter to compensate for the colour non-uniformities. In the trial and error process, the number of iterations can be reduced by logical reasoning, as illustrated in FIG. 11 which shows a top view of the embodiment of FIG. 10.

Figure 11:
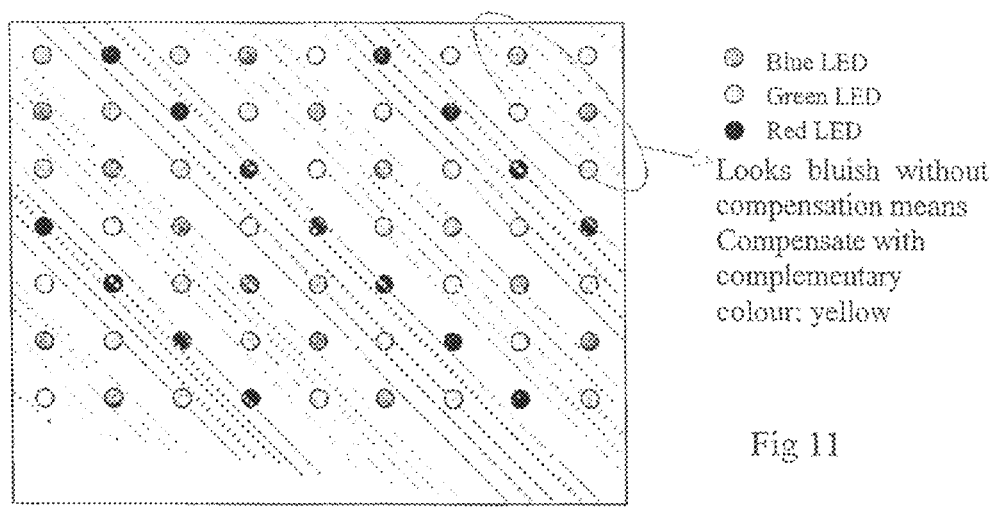
FIG. 11 shows a plan view of a pattern of an optical filter and an array of colour LEDs

In the diagonal LED configuration of FIG. 11, in the embodiment of FIG. 10, suppose that the z colour coordinate (CIE1931 colour coordinate system) is 0.05 higher on average over an imaginary line drawn over a row of blue LEDs than over the rest of the screen, and that the x colour coordinate above the red LEDs is 0.03 higher than over the average of the rest of the screen in the original configuration without yellow or cyan compensation filter, e.g. coloured dots. Further suppose that with the filter, e.g. coloured dots, as in FIG. 11, the z coordinate above the blue LEDs is still 0.025 higher than the average over the screen, while the x coordinate above the red LEDs is no higher anymore than over the average of the screen, then it is logical to double the density of the yellow filter, e.g. yellow dots and to keep the density of the cyan filter, e.g. cyan dots in the next run.

Embodiments of the present invention may be applied advantageously in backlights of all kinds, including panel lights for viewing photographic film or other purposes. For example, the present invention can be applied to backlights not relying on LEDs as light sources. The use of coloured filters, e.g. coloured paints of different colours, to compensate for remaining colour non-uniformities in backlights, is not restricted to LED backlights alone, but can e.g. also be used in backlights in which OLEDs or other discrete light sources are used, e.g. when fluorescent lamps of 2 or 3 different colours are used as light sources. Embodiments of the present invention may be applied advantageously in panel lights for general lighting use.

The invention claimed is:

1. A display comprising
a backlight having a plurality of differently colored light sources, the backlight being coupled to a spatial light modulator,
a display element part having addressable pixels of the spatial light modulator for dynamically controlling a luminance of each of said addressable pixels according to an input signal, the input signal comprising the information corresponding to an image to be displayed by the addressable pixels of the display, the spatial light modulator having a non-uniform spatial optical characteristic dependent upon video level,
an optical and electronic correction part having an optical filter having a non-uniform spatial pattern to alter the luminance and/or color to compensate at least partially for the non-uniform spatial optical characteristic of the spatial light modulator and an electronic signal processing element arranged to apply some pre-compensation for the non-uniform spatial optical characteristic of the spatial light modulator to the input signal,
wherein the optical filter is arranged downstream of the spatial light modulator.

2. The display of claim 1, the pre-compensation being predominantly of higher spatial frequencies than spatial frequencies of the spatial pattern.

3. The display of claim 1, the spatial light modulator comprising a reflective or transmissive device, and the display comprising a light source.

4. The display of claim 3, the light source having a third non-uniform spatial optical characteristic, and the optical filter being arranged to compensate at least partially for the third non-uniform spatial optical characteristic.

5. The display of claim 1, the spatial light modulator comprising a pixel addressable light emitting device.

6. The display of claim 1, the optical filter comprising a layer having printed dots.

7. The display of claim 1, the optical filter comprising a layer having a line pattern.

8. The display of claim 1, the optical filter comprising a dynamically alterable spatial pattern.

9. The display of claim 1, the non-uniform spatial optical characteristic comprising any of contrast ratio, luminance, and color point.

10. The display of claim 1, the display furthermore comprising a backlight system having an intentionally non-uniform spatial optical output.

11. The display of claim 10, wherein the pre-compensation is performed by spatially modulating an optical source of the backlight system.

12. A method of configuring a display with a display element having addressable pixels, the display element being for dynamically controlling a luminance and/or color of one or more pixels and an electronic and optical correction part having an optical filter for compensating for non-uniformity of luminance or color of the display element, the method comprising:
measuring an output for different pixels of the display element without the optical filter,
determining a pattern for a filter according to the measurements,
determining an amount of electronic pre-compensation additional to the compensation by the optical filter, wherein the amount of electronic pre-compensation corresponds to the difference between the determined pattern and the optical filter,
making the filter,
arranging the filter downstream of the display element, and
configuring the electronic pre-compensation for the display.

13. The method of claim 12, including the further step of measuring an output for different pixels with the filter, determining a pattern for a further filter according to the measurements, and making the further filter for the display.

14. A display comprising
a backlight system, a display element having addressable pixels and a spatial light modulator for dynamically controlling a luminance of each pixel according to an input signal,
the spatial light modulator of the display element having a non-uniform spatial optical characteristic dependent upon video level,
the backlight system having an optical correction comprising an optical filter having at least two of yellow, cyan and purple areas to have a light output that is intentionally spatially non-uniform to alter the luminance and/or color to compensate at least partially for the non-uniform spatial optical characteristic of the spatial light modulator of the display element, wherein the optical filter is arranged downstream of the spatial light modulator, and
the display having an electronic signal processing element arranged to apply some additional pre-compensation for the non-uniform spatial optical characteristic of the spatial light modulator of the display element to the input signal.

15. A display according to claim 14, wherein the light output that is intentionally non-uniform of the backlight system contains inverse non-uniformities of the remaining display system.

16. A display according to claim 15, wherein the pre-compensation by said electronic signal processing element is applied by spatial modulation of the backlight.

17. A display according to claim 15, the backlight system comprising a plurality of discrete light sources of at least two different colors.

18. A display according to claim 15 wherein the pre-compensation by the electronic signal processing element is predominantly of higher spatial frequencies than the spatial frequencies of the intentionally non-uniform light output.

19. A display according to claim 15, the spatial light modulator comprising a pixel addressable light emitting device.

20. A display according to claim 14, the non-uniform spatial optical characteristic of the spatial light modulator comprising any of contrast ratio, luminance, and color point.

21. A method of configuring a display having a display element with addressable pixels, the display element being for dynamically controlling a luminance and/or color of one or more pixels and a backlight system having an intentionally spatially non-uniform light output for compensating for non-uniformity of luminance or color of the display element dependent upon video level, the method comprising:
  measuring an output for different pixels with the backlight system not having the intentionally non-uniform light output,
  determining a pattern for the intentionally spatially non-uniform light output of the backlight system in agreement with the measurements,
  determining an amount of additional electronic pre-compensation,
  altering the optical design of the backlight system according to the determined pattern,
  configuring the electronic pre-compensation for the display,
  measuring an output for different pixels with the intentionally spatially non-uniform light output of the backlight system,
  determining a pattern for a further filter according to the measurements,
  making the further filter for the display, and
  arranging the filter downstream of the display element.

22. A display comprising:
  a display element having addressable pixels and a spatial light modulator for dynamically controlling a luminance of each pixel according to an input signal,
  the spatial light modulator having a non-uniform spatial optical characteristic dependent upon video level of the input signal to the display element,
  the display also having a correction part comprising an optical filter in the same optical path as the display element and having a non-uniform spatial pattern to alter the luminance or color to compensate at least partially for the non-uniform spatial optical characteristic of the spatial light modulator,
  wherein the optical filter is arranged downstream of the spatial light modulator.

23. A display, comprising:
  a backlight and display element comprising a spatial light modulator,
  the backlight being arranged to illuminate the spatial light modulator, the backlight comprising a plurality of differently colored light sources, and having a color output which has a first non-uniform spatial optical color characteristic caused by said plurality of differently colored light sources, and the spatial light modulator having a second non-uniform spatial optical characteristic dependent upon video level, and
  an optical correction comprising an optical filter having a non-uniform spatial pattern arranged to alter the color to compensate in part at least for the first non-uniform spatial optical color characteristic of the backlight to thereby produce a spatially more uniform color output, the optical filter comprising a layer having dots, wherein the dots vary in size and/or spatial density, and
  the non-uniform spatial pattern is additionally being arranged in a way to compensate in part at least for the second non-uniform spatial optical characteristic of the spatial light modulator,
  wherein the optical filter is arranged downstream of the spatial light modulator.

24. The backlight of claim 23, wherein the spatial pattern having the dots form a geometric pattern.

25. The backlight of claim 23, wherein the layer of dots is configured in a way such that a spectral response of the layer of dots is not flat.

26. The display of claim 25, wherein the optical filter having the non-uniform spatial pattern compensates for the color output caused by said plurality of differently colored light sources varying from point to point on the non-uniform spatial pattern.

27. The display of claim 26, wherein the backlight is arranged in a cavity, the cavity having a backwall and a front wall located opposite the backwall, both the backwall and the front wall being arranged in planes which are parallel to the plane of the spatial light modulator, respectively, wherein the plurality of differently colored light sources is provided in niches in the backwall of the cavity of the backlight and wherein the front wall is the light outputting side, the optical filter having the non-uniform spatial pattern being provided on the backwall of the cavity of the backlight or at a light outputting side of the backlight.

28. The display of claim 25, the backlight furthermore having a third non-uniform spatial optical luminance characteristic, wherein the optical filter furthermore has a non-uniform spatial pattern to alter the luminance to compensate in part at least for the third non-uniform spatial optical luminance characteristic.

29. The display of claim 25, the plurality of differently colored light sources comprising color LEDs or OLEDs.

30. The display of claim 25, the non-uniform spatial pattern of the optical filter having multiple layers.

31. The display of claim 27, wherein the plurality of light sources are arranged to direct light substantially parallel to the backwall, the backwall having reflectors to redirect the light out of the backlight.

32. The display of claim 25, the non-uniform spatial pattern comprising a spatial distribution of different colors over the optical filter.

* * * * *